FIG. 4.

OSKAR KYLIN
HENRIK O. KYLIN  INVENTORS
MICHAEL L. VALENTINO
BY
Hawgood & Van Horne
THEIR ATTORNEYS May 14, 1946.　　　O. KYLIN ET AL　　　2,400,237
HYDRAULIC RAPID TRAVERSE
Filed Nov. 18, 1942　　　5 Sheets-Sheet 4

OSKAR K LIN
HENRIK O. KYLIN   INVENTORS
MICHAEL L. VALENTINO
BY
*Haygood + Van Horn*
THEIR ATTORNEYS Patented May 14, 1946

2,400,237

UNITED STATES PATENT OFFICE 2,400,237

HYDRAULIC RAPID TRAVERSE

Oskar Kylin, Henrik O. Kylin, and Michael L. Valentino, Cleveland Heights, Ohio, assignors to Bardons and Oliver, Inc., Cleveland, Ohio, a corporation of Ohio Application November 18, 1942, Serial No. 465,966

2 Claims. (Cl. 82—21)

Our invention relates to machine tools and more particularly to means for selecting or preselecting and controlling the rate of feed of a slide member.

It is one of the objects of our invention to provide in a machine tool means for controlling the rate of feed of a slide member carrying tools or material to be worked by tools.

Another object of the invention is to provide in a machine tool hydraulically actuated means for selecting or preselecting the rate of feed of a slide member.

A further object of the invention is the provision of a feed mechanism for a tool or work slide in which the mechanism may be caused to feed the slide at selected rates of feed along a machine tool bed.

Another object of the invention resides in a feed slide member having means associated therewith by which the slide may be caused to be fed along a machine bed at any one of a plurality of selected rates of feed, said means including a selective speed transmission, hydraulically actuated means for a selected gear ratio in the transmission, and a single control member for controlling the operation of the hydraulic means.

A further object of the invention resides in the provision of a single control member within convenient reach of a machine tool operator, controlling the operation of a feed tool or work supporting slide member.

Another purpose of the invention is to provide in a machine tool a single compact means for selecting or preselecting the rates of feed of a tool slide and controlling the operation of means for effecting selected gear ratios for traversing the slide at different rates of feed along a machine tool bed.

A still further object of the invention consists in providing in a machine tool a compact unit comprising means for selecting or preselecting the rates of feed of a tool slide, and a control member for actuating hydraulic means whereby to effect a selected gear ratio for feeding the tool slide at a selected rate of feed along a machine tool bed.

Other objects and advantages of our invention will become more apparent as the following description of an embodiment progresses, reference being made to the accompanying drawings in which like reference characters are employed to designate like parts throughout the same.

In the drawings we have illustrated our invention as applied to a machine tool such as a turret lathe, although it is to be understood that the invention may equally well be applied to other machine tools which have as an essential part a tool or work carrying slide member which is operated to feed a tool or a work piece, one relative to the other.

The form of our invention illustrated in the accompanying drawings is so constructed and arranged that the selecting and preselecting means and the control member for effecting a gear change are located preferably on the apron of the slide member and within easy and convenient reach of the operator, the control member being operable in either of two directions for opening the control valve.

Due to the construction and arrangement illustrated, the entire assembly is compact and is free of protruding parts with respect to the front of the machine tool which might interfere with the operator's efficiency and the entire mechanism is well protected against metal particles or other foreign matter which might quickly destroy the usefulness of the parts, if they had access to the gear box or to the hydraulic control means.

The invention as illustrated in the drawings may be described more particularly as follows:

The carriage 1 is slidably mounted on the machine tool bed to slide along the bedways or track members 2 in either direction. A cross slide 3 is supported on the carriage in the usual manner. The carriage apron gear box 4 houses a sliding gear transmission such as is illustrated more fully in Figure 3 for imparting a feed to the carriage and slide longitudinally of the machine bed and for imparting a cross feed to the cross slide 3. The power feed to the cross slide may be engaged and disengaged by means of a lever 5, while a manual cross feed may be imparted to the cross slide by means of a hand wheel 6. Similarly, power feed may be imparted to the slide by means of a lever 7 which may be actuated to engage or disengage the slide from power feed while a hand wheel 8 is provided for manual feed of the slide longitudinally of the machine bed. The stops 9 and 10 are provided on the gear box below the respective levers 5 and 7 to limit downward motion of the levers in their disengaged positions.

Figure 3:
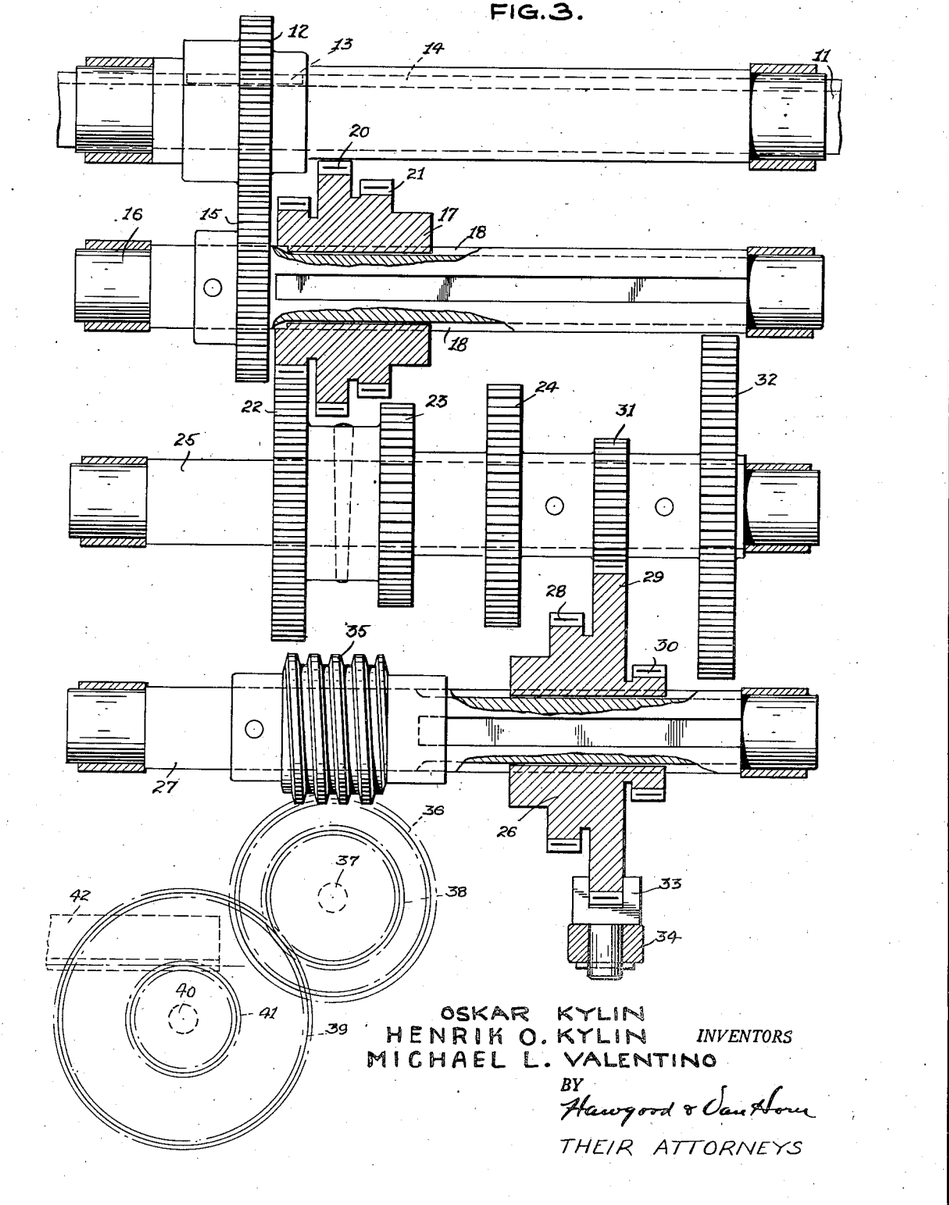
Figure 3 is a view of the power transmission mechanism housed within the apron of the slide member, showing some of the parts in section and illustrating the drive from the power feed shaft through the transmission to effect a movement of the carriage along the bed of the machine tool.

Referring now more particularly to Figure 3, the sliding gear transmission which is housed within the slide apron derives its power from a feed shaft 11 which has suitable power connection to a source of power. A drive gear 12 is rotatable with the feed shaft and is slidably keyed to the shaft by means of a key 13 operating in a key-way 14. The gear 12 is in mesh with a gear 15 keyed to a shaft 16, there being a three clustered gear 17 keyed to rotate with the shaft 16 but slidable on the shaft along the key-ways or splines 18.

The three clustered gear comprises the gears 19, 20, and 21, which are adapted to mesh selectively with the gears 22, 23, and 24, respectively, keyed to rotate with the shaft 25. We have shown in Figure 3 the gear 19 in mesh with the gear 22, which represents one selected gear ratio between the shafts 16 and 25.

A three clustered gear 26 is rotatable with the shaft 27 and is slidable thereon as indicated in the drawings. This cluster comprises the gears 28, 29, and 30, which are adapted to mesh selectively with the gears 24, 31 and 32, rotatable with the shaft 25. In the position shown, gear 29 is in mesh with gear 31. However, the gear cluster 26 is slidable so as to engage gear 28 with 24, 29 with 31, or 30 with 32, as may be desired. The gear cluster 26 is slidable along the shaft 27 through a fork connection 33, carried by a lever 34 which is actuated by hydraulic means, hereinafter referred to.

A worm 35 is also keyed to the shaft 27 and rotates therewith and is always in mesh with a worm gear 36 to rotate the latter on a shaft 37.

The worm gear is provided with an annular gear section 38, which is in mesh with a gear 39 operating on a shaft 40, there being also a pinion 41 fixed to the gear 39 engageable with a rack bar 42 which is mounted on the machine bed. Thus it will be seen that for whichever gear ratio is selected, there is power driving connection through the transmission in the manner described above to drive the pinion 41 along the rack 42, thus imparting longitudinal motion to the slide carriage at the ratio selected.

Figure 4:
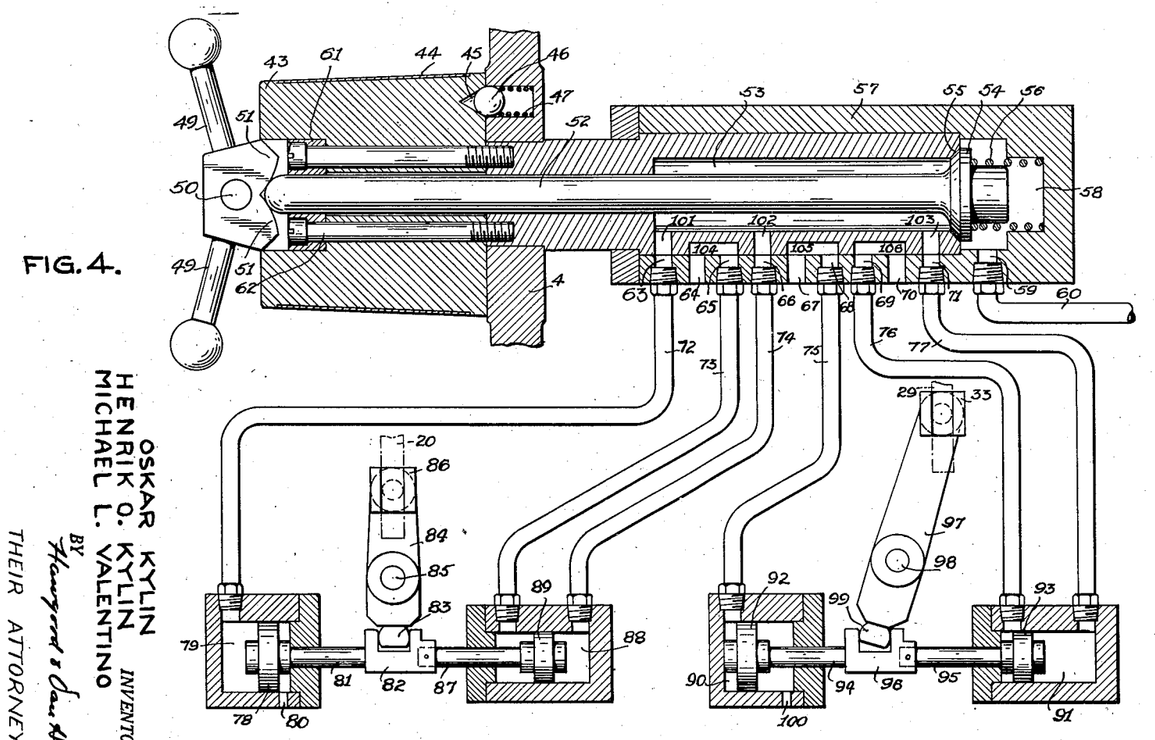
Figure 4 is a view of the hydraulic control valve and the selecting or preselecting member, both shown partly in section. This view also illustrates the distribution of fluid under pressure to the several gear cluster actuating members.
Figure 5:
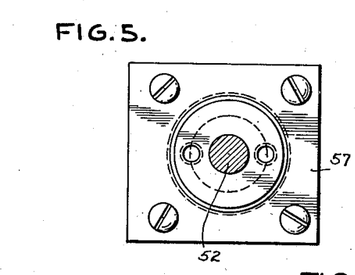
Figure 5 is a front end view of a hydraulic preselector valve.
Figure 6:
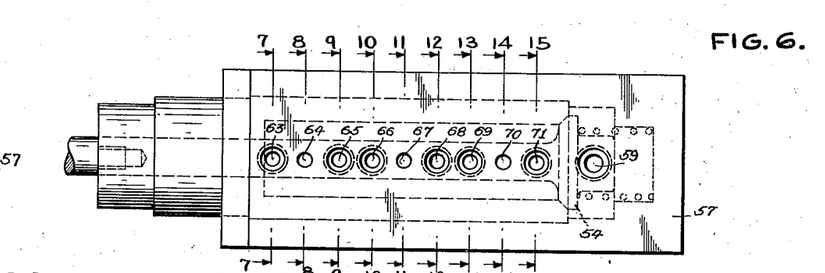
Figure 6 is a side view of the same, showing the several ports of the valve.

Referring now more particularly to Figure 4, we have illustrated a form of a selector or preselector for the gear ratios together with a control member for effecting a selected or preselected gear combination. While we have illustrated hydraulic means for actuating the gear clusters, any other suitable means of shifting the gear clusters could be employed without departing from the spirit of the present invention. Electrical, magnetic, or mechanical means could be employed for this purpose, if desired.

The selector and control unit is mounted on the slide apron housing the transmission and is arranged to extend along the bed of the machine and preferably well within the confines of the outer surface of the slide apron in order to avoid protruding parts and also to locate the unit within easy and convenient reach of the operator. This is illustrated more clearly in Figures 1 and 2. A feed selector and indicating drum 43 is provided with a drum feed indicating plate 44 extending around its periphery on which there are suitable indicia for indicating the various rates of feed which can be obtained from the sliding gear transmission.

Figures 1, 2:
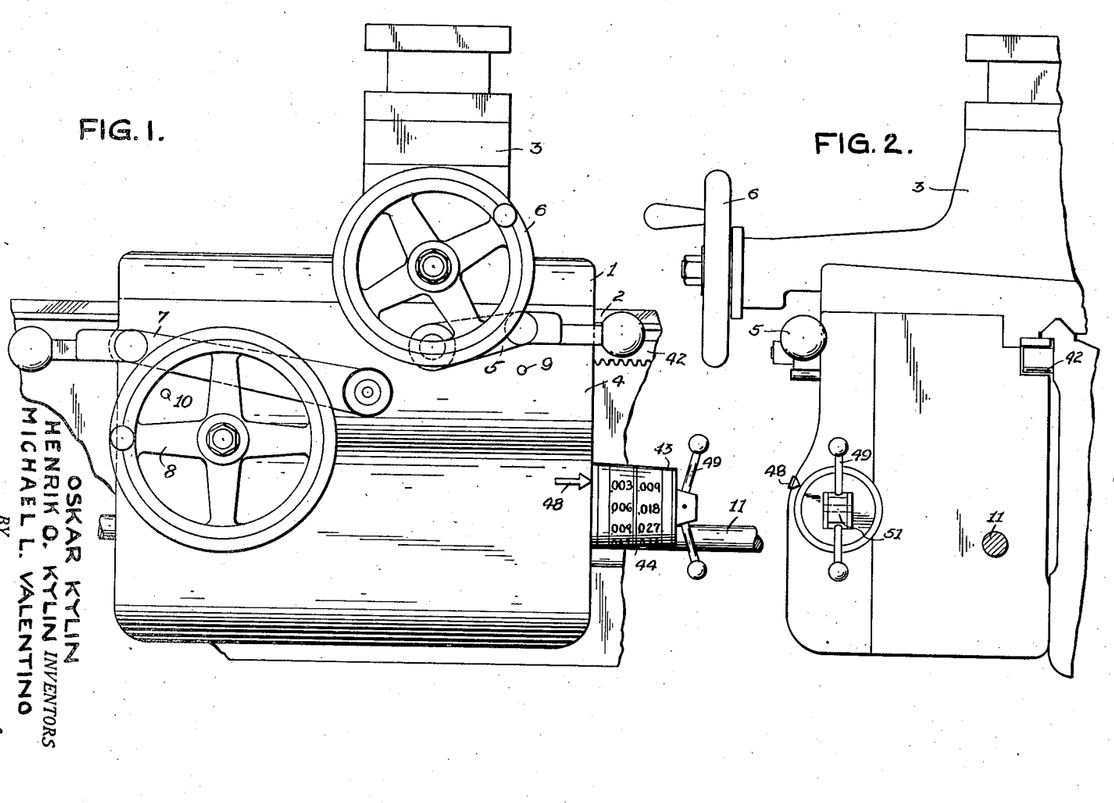
Figure 1 is a front elevation of a slidable tool or work carrying member of a machine tool, showing means for selecting or preselecting the rate of feed of the slide member and together with control means for effecting a selected gear ratio in the sliding gear transmission housed within the apron of the slide member in accordance with our invention.
Figure 2 is a side elevation of the parts shown in Figure 1.
Figure 17:
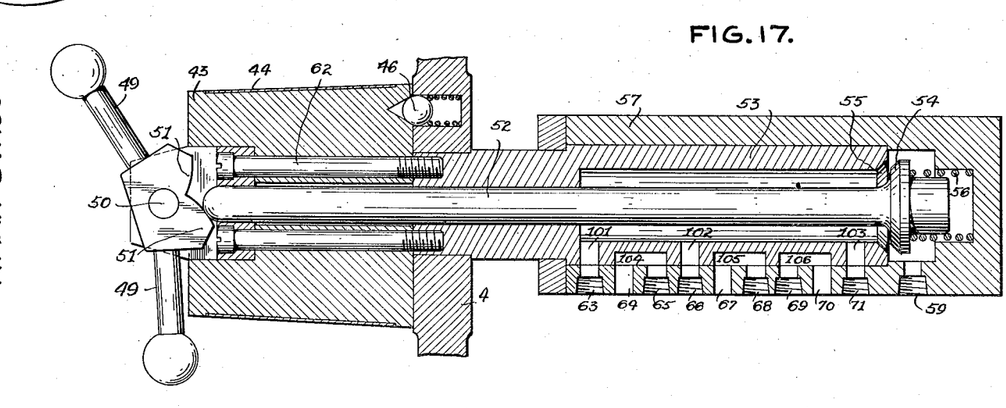
Figure 17 is a sectional view through the hydraulic preselector valve control showing the valve opened as a result of depressing the control lever in either of two directions.

The inner surface of the drum is provided with detents 45, each in alignment with one of a series of indicia on the indicator plate, there being a spring pressed ball 46 carried by the apron wall and projected outwardly by the spring 47 to engage the detents as the drum is rotated in either direction, thus enabling the operator to determine by the seating of the ball in the detents, the proper position of a selected indicia and the rotary valve 53 with respect to the indicating arrow 48 as shown in Figure 1. The control member includes a two way operating handle 49 pivotally mounted at 50 in the end of the drum 43 and having a pair of outwardly diverging cams 51 for engagement with the valve stem 52 as shown in Figure 4. The valve stem extends axially through the drum and the valve cylinder or chamber 53, and is slidable longitudinally therein when the lever 49 is actuated in either direction. It is to be noted that the outer end of the valve stem is rounded to engage both of the cams 51 when the valve is closed, and to engage either one of the cams 51 when the handle 49 is rocked to open the valve 54 as shown in Figure 17. The valve 54 seats in the end of the cylinder, as at 55, and is normally thrust into seating position with the end of the cylinder by a compression spring 56 to exclude fluid under pressure from the chamber of the rotary valve 53.

The valve casing, which is indicated at 57, is provided with a seat 58 for the spring 56 and is also provided with an inlet port 59 for communication with fluid under pressure entering through the conduit 60.

When the lever 49 is depressed in either direction and the valve 54 is unseated, fluid under pressure entering the port 59 will enter the cylinder or chamber 53 behind the valve head for distribution through a plurality of distributing ports provided in the cylinder wall and communicating with certain selected ports in the valve casing.

It will be noted that the rotatable selector drum 43 is rigidly connected with the operating handle support 61 and with the hub of the rotary valve cylinder 53 by means of the elongated bolts 62 which pass through openings in the drum. In this manner the entire selector drum, control lever and rotary valve 53 may be rotated together as a unit to select the proper valve position corresponding with the selected rate of traverse of the slide along the machine bed.

The rotary valve casing 57 is provided with a series of ports 63, 64, 65, 67, 68, 69, 70 and 71, of which the ports 63, 65, 66, 68, 69 and 71 are connected by conduits 72, 73, 74, 75, 76 and 77 to deliver fluid under pressure to the gear cluster operating units or to exhaust fluid therefrom depending upon the position of the rotary valve 53. In the rotary valve position shown in Figure 4 and in the respective sectional views shown in Figures 7 to 15 inclusive, fluid under pressure will be transmitted through the conduit 72 to the left hand side of the piston 78 operating in the cylinder 79 thereby tending to force the piston to the right.

A vent 80 in the cylinder prevents the formation of air or fluid traps in the cylinder. The free end of the piston rod 81 abuts the member 82 which is recessed to receive the headed end 83 of a gear cluster shifting lever 84 pivotally supported in the casing 4 at 85.

The upper end of the lever 84 carries a forked member 86 which slidably receives the outer portion of the gear 20. In Figure 3 the means for shifting the gear cluster 19, 20 and 21 is not shown but Figure 4 clearly illustrates its function and relationship to this particular cluster.

The member 82 is attached to and moves with the piston rod 87 operating in the cylinder 88 and carrying at its other end the piston 89. Conduits 73 and 74 connect the ports 65 and 66 with the cylinder 88 on opposite sides of the piston 89.

A similar means is provided for sliding the gear cluster 28, 29 aand 30 on its shaft 27 and consists of the cylinders 90 and 91, the pistons 92 and 93, and the respective piston rods 94 and 95, the rod 94 merely abutting the member 96, while the rod 95 is attached to the said member. The gear cluster shifting lever 97 is pivotally carried at 98 in the casing 4 its lower headed end 99 seating in the recessed member 96, while its upper end is provided with a forked gear engaging member 33 for slidably engaging the rotating gear 29 of this sliding cluster as indicated in Figure 3.

A conduit 75 connects the rotary valve casing port 68 with the cylinder 90 on the left side of the piston 92, there being a vent hole 100 in this cylinder to prevent the formation of air or fluid traps. Conduits 76 and 77 connect the ports 69 and 71 of the rotary valve casing with the cylinder 91 on opposite sides of the piston 93.

The rotary valve 53 comprises an axial chamber or cylinder portion which is formed with a plurality of radial ports extending through the wall of the cylinder to communicate fluid under pressure from within the chamber to any of the selected ports 63, 65, 66, 68, 69 or 71. Longitudinal by-passing grooves or slots are also formed along the outer surface of the rotary valve cylinder 53 and serve to communicate selected ports connected by conduits to the gear cluster sliding units, with the radially arranged fluid exhaust ports 64, 67 and 70 whereby fluid may be exhausted from the cylinders 79, 88, 90 and 91, depending, of course, upon the direction of motion of the respective pistons in these cylinders.

Attention is directed to the disclosure of the fluid supply and exhaust ports and channels formed in the rotary valve cylinder 53 as shown in Figures 7 to 15 inclusive. We have not shown all of these ports and channels in the longitudinal sections of the valve shown in Figures 4 and 17 for the purpose of avoiding confusion, but it is intended that the cylinder of the rotary valve 53 shall be formed with such ports and channels in the manner disclosed in Figures 7 to 15 inclusive.

With the rotary valve in the position shown in Figures 4 and 17, port 63 and conduit 72 will communicate with the interior of the rotary valve cylinder 53 through the radial port 101. Likewise radial ports 102 and 103 will communicate fluid under pressure from the chamber 53 to the conduits 74 and 77 respectively. At the same time conduits 73, 75 and 76 will be open to exhaust through the respective channels 104, 105 and 106 and the respective exhaust ports 64, 67 and 70 in the valve casing. Fluid exhausted from any of these exhaust ports will be delivered to the interior of the gear box 4.

When the rotary valve is in the position just described and the operator opens the valve 54 by depressing either handle 49, fluid under pressure will pass from the chamber 58 and the supply line 60 around the valve head 54 and into the valve chamber 53 where it will be distributed to the cylinders 79, 88 and 91 simultaneously. As the fluid enters the cylinder 79 from the conduit 72, the piston 78 will be moved to the right, as shown, toward the vented end of the cylinder 79, while the free end of the piston rod 81 will be extended to abut the member 82 when it is moved to the left as fluid under pressure enters the cylinder 88 from the conduit 74, thus centering the member 82 and bringing the gear 20 into mesh with gear 23, and centering piston 89 in the cylinder 88 between the ports leading to the conduits 73 and 74.

During the same operation, the cylinder 90 is open to exhaust through the conduit 75 and exhaust port 67, while fluid under pressure is delivered through conduit 77 to the cylinder 91 against the right hand side of the piston 93, forcing the piston to the left and along with it the piston 92 and the member 96. In this manner the arm 97 is shifted in a clockwise direction to engage the gears 30 and 32 (see Fig. 3).

The selected gear ratio thus obtained may be described as represented in a drive through the shaft 11, gears 12, 15, 20, 23, 30 and 32 of the transmission proper.

As will be seen from Figures 7 to 15 inclusive, we have illustrated eight other rotative positions of the rotary valve 53 corresponding to selective gear ratios, although it is to be understood that the present invention contemplates additional or even fewer selective gear ratios and corresponding feed rates, as desired.

To more clearly illustrate the selection of another rate of feed, let it be supposed that the operator rotates the drum 43 together with the rotary valve 53 and the operating handles 49, one position in a clockwise direction as viewed in Figure 1. Referring now more particularly to Figures 7 to 15 inclusive, the rotary valve cylinder 53 is shown in transverse section. When the valve is thus rotated one position, ports 63 and 64 in Figures 7 and 8, respectively, will be closed. In Figure 9 the radial port 107 will, when the valve 54 is opened, communicate fluid under pressure from the valve chamber 53 through the conduit 73 to the left hand side of piston 89, while channel 108 in Figures 10 and 11 will permit the exhaust of fluid from cylinder 88 through conduit 74, channel 108 and port 67. Thus the piston 89 will move to the full end of its stroke to the right in Figure 4. Since port 63 is closed, the piston 78 will remain in its previous position as shown, but movement of the piston 89 to the right will swing the arm in a counterclockwise direction to bring the gear 19 into mesh with gear 22, as shown in Figure 3. In Figure 12, radial port 109 will be in alignment with the port 68 to deliver fluid under pressure through the conduit 75 to the cylinder 90 when valve 54 is opened, whereby to force the piston 92 to the right in Figure 4 and with it the member 96, thus centering the arm 97 in a counterclockwise direction to disengage gears 30 and 32 which were engaged in the previously selected feed rate and to engage gears 29 and 31 as shown.

Figure 13:
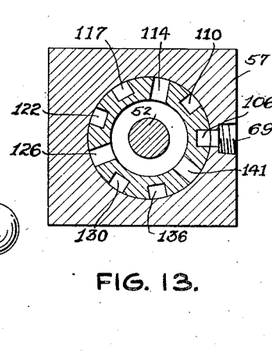
Figure 13 is a section taken on line 13—13 of Figure 6.
Figure 14:
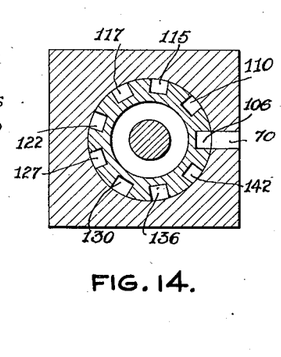
Figure 14 is a section taken on line 14—14 of Figure 6.
Figure 15:
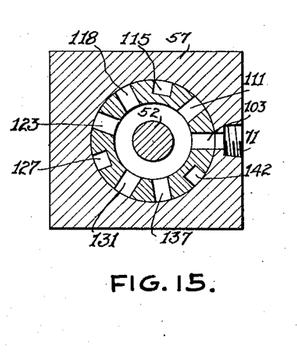
Figure 15 is a section taken on line 15—15 of Figure 6.
Figure 16:
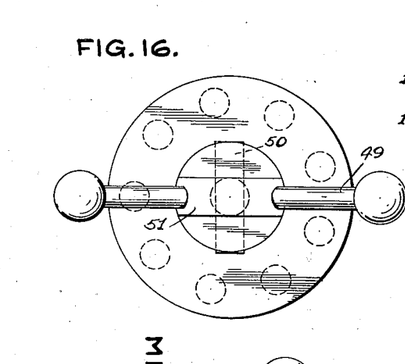
Figure 16 is an end view of the hydraulic preselector valve control member.

In Figures 13 and 14, channel 110 communicates with the ports 69 and 70, thus opening conduit 76 to exhaust through port 70. In Figure 15, radial port 111 will be in alignment with port 71 admitting fluid through conduit 77 to the right hand side of piston 93 when valve 54 is depressed.

Thus the arm 97 will be held in this centered position and the resulting drive ratio through the transmission will be that represented by the meshed gears 19 and 22, 29 and 31, as shown in Figure 3.

When the operator rotates the selector drum 43 to the second next position in a clockwise direction from that shown in the drawings, ports 63 and 64 will again be closed, but such rotation of the drum and rotary valve will bring radial port 112, Figure 9, into register with port 65 and, by opening valve 54, fluid under pressure will be delivered through the conduit 73 to the left hand side of piston 89.

Figure 10:
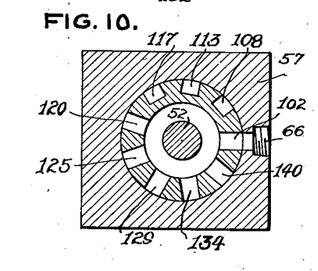
Figure 10 is a section taken on line 10—10 of Figure 6.
Figure 11:
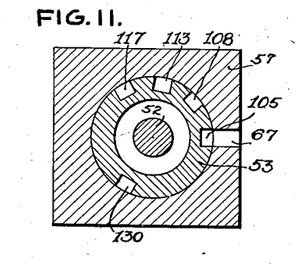
Figure 11 is a section taken on line 11—11 of Figure 6.
Figure 12:
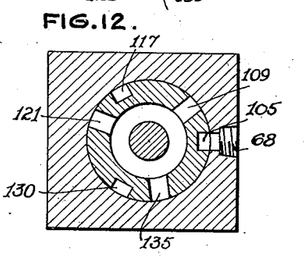
Figure 12 is a section taken on line 12—12 of Figure 6.

In Figures 10 and 11 the ports 66 and 67 will be in communication with the channel 113 to exhaust fluid from the right hand end of the cylinder 88 through conduit 74, while in Figure 12, port 68 will be closed to cylinder 90. In Figure 13 the radial port 114 will be in alignment with port 69 to feed fluid under pressure from the chamber 53 through conduit 76 to the left hand end of cylinder 91 when the valve 54 is depressed, while as shown in Figures 14 and 15, ports 70 and 71 will be opened to exhaust fluid from the other end of cylinder 91 through conduit 77 and channel 115.

In this selected position of the rotary valve, only cylinders 88 and 91 will receive fluid under pressure in the manner just described, thus retaining piston in its extreme right hand position as it was left in the last preceding selected position of drum 43, and moving piston 93 to its extreme right hand position in the cylinder 91. The gear ratios thus selected will be represented by meshed gears 19 and 22 and by meshed gears 24 and 28.

Figure 7:
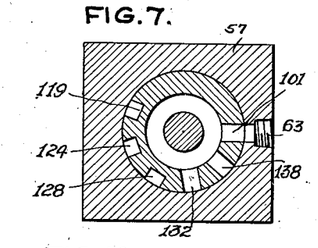
Figure 7 is a section taken on line 7—7 of Figure 6.
Figure 8:
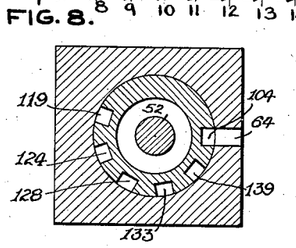
Figure 8 is a section taken on line 8—8 of Figure 6.
Figure 9:
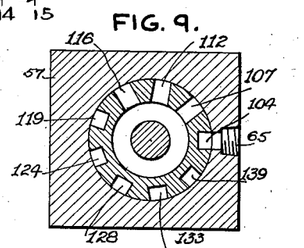
Figure 9 is a section taken on line 9—9 of Figure 6.

Continuing the description of the several selected rates of feed, it will be seen that when the drum is rotated to the next position from that just described and the valve 54 is opened, ports 63 and 64 remained closed as in Figures 7 and 8, the piston 78 remaining in the position shown in Figure 4. In Figure 9 radial port 116 communicates fluid under pressure from the chamber 53 through port 65 and conduit 73 to the left side of piston 89 to retain it in its immediately previous position, while its opposite side is open to exhaust through conduit 74, port 67 and channel 117 as may be seen from Figures 10 and 11. Channel 117 also registers with ports 68, 69 and 70 in this position of the drum relieving the left ends of cylinders 90 and 91. Fluid under pressure is delivered through radial port 118, port 71 and conduit 77 to the right side of piston 93 to rock the arm 97 to the position shown in Figure 4. Thus, with the arm 84 rocked to the left to engage gears 19 and 22 and the arm 97 positioned to engage gears 30 and 32, the selected gear ratio is obtained.

It will be noted that as the piston 93 moves to the left together with the member 96, the member will abut the free end of the piston rod 94 to slide the piston 92 from a right hand to a left hand position in the cylinder 90. When the drum 43 is rotated to the next successive selected speed indication and the slide valve is depressed, it will be seen from Figures 7, 8 and 9 that the respective ports 63, 64 and 65 are in communication with the channel 119 to relieve the left hand ends of cylinders 79 and 88 through conduits 72 and 73, respectively.

In Figure 10 the port 66 is registered with radial port 120 to deliver fluid under pressure to the conduit 74 to the right hand side of cylinder 88.

In Figure 11 port 67 is closed, while in Figure 12 port 68 is in communication with a radial port 121 for delivering fluid under pressure through the conduit 75 to the left hand end of cylinder 90.

In Figures 13 and 14 a channel 122 will register with ports 69 and 70 to relieve the left hand end of cylinder 91 through a conduit 76, while in Figure 15 the radial port 123 will register with port 71 to deliver fluid under pressure through the conduit 77 to the right hand end of cylinder 91.

Under these conditions, it will be seen that the piston 89 will be moved to the left for its full stroke, moving with it the piston 78 and rocking the arm 84 in a clockwise direction to engage gears 21 and 24.

Likewise, the piston 92 will be urged to the right, while piston 93 will be urged to the left to center the arm 97, thereby engaging gears 29 and 31 to complete the selected gear ratio.

To select the next successive gear ratio, as indicated on the drum, the operator rotates the drum in the same direction to the next position, whereupon channel 124 illustrated in Figures 7, 8 and 9 will communicate with the ports 63, 64 and 65 and relieve the left hand ends of cylinders 79 and 88 through the conduits 72 and 73, respectively.

In Figure 10, the radial port 125 communicates fluid under pressure through the port 66 and conduit 74 to the right hand end of cylinder 88.

In Figures 11 and 12, ports 67 and 68 are closed.

In Figure 13, the radial port 126 communicates fluid under pressure from the interior of the rotary valve through port 69 and conduit 67 to the left hand end of cylinder 91, while in Figures 14 and 15 channel 127, which is in communication with ports 70 and 71, relieves the right hand end of cylinder 91 through a conduit 77.

Under the conditions just described gears 21 and 24 will remain in mesh, while the arm 97 will have been shifted in counterclockwise direction to engage gears 28 and 24. The next position of the radial valve may be described as follows: In Figures 7, 8 and 9 the channel 128 is in registry with ports 63, 64 and 65 to relieve the left hand ends of cylinders 79 and 88 through conduits 72 and 73, respectively.

In Figure 10 radial port 129 communicates fluid under pressure from the valve chamber through port 66 and conduit 74 to the right hand end of cylinder 88.

In Figures 11, 12, 13 and 14 channel 130 communicates with ports 67, 68, 69 and 70 to relieve the left hand ends of the cylinders 90 and 91 through the conduits 75 and 76, while in Figure 15 the radial port 131 will be in register with port 71 to deliver fluid under pressure through conduit 77 to the right hand end of cylinder 91.

Under these conditions, arm 84 will remain in its previous position to engage gears 21 and 24, while the piston 93 will be moved to the left together with the member 96 to abut the free end of the piston rod 94 and thereby slide the piston 92 to its extreme left hand position. The arm 97 is thus rocked in a clockwise direction to engage gears 30 and 32. Thus a gear ratio rotary by meshed gears 21 and 24 and meshed gears 30 and 32 is obtained.

The next successive gear ratio selection may be obtained by rotating the rotary valve to its next successive position in the direction already indicated. When the valve is rotated, a radial port 132, Figure 7, will deliver fluid under pressure from the valve chamber through port 63 and conduit 72 to the left hand end of cylinder 79.

In Figures 8 and 9 a channel 133 communicates with the ports 64 and 65 to relieve the left hand end of cylinder 88 through a conduit 73.

In Figure 10, a radial port 134 will deliver fluid under pressure through the port 66 and the conduit 74 to the right hand end of cylinder 88.

In Figure 11, the port 67 will be closed, while in Figure 12 the port 68 will be in register with a radial port 135 to deliver fluid under pressure through a conduit 75 to the left hand end of cylinder 90.

In Figures 13 and 14, a channel 136 registers with the ports 69 and 70 to relieve the left hand end of cylinder 91 through the conduit 76, while in Figure 15, a radial port 137 will be in register with the port 71 to deliver fluid under pressure through the conduit 77 to the right hand end of cylinder 91.

Under these conditions, pistons 78 and 92 will be forced to the right for their extreme strokes, while the pistons 89 and 93 will be moved to the left to a centering position in their respective cylinders, thus centering the arms 84 and 97, respectively, to engage gears 20 and 23 and to engage gears 29 and 31.

In the final selection of gear ratios, as provided in the embodiment illustrated, a radial port 138 in Figure 7 communicates fluid under pressure through a port 63 and conduit 72 to the left hand end of cylinder 79.

In Figures 8 and 9, channel 139 is in register with the ports 64 and 65 to relieve the left hand end of cylinder 88 through a conduit 73.

In Figure 10 a radial port 140 will register with the port 66 to deliver fluid under pressure through conduit 74 to the right hand end of cylinder 88, while in Figures 11 and 12 the ports 67 and 68 will be closed. In Figure 13 a radial port 141 will register with port 69 to deliver fluid under pressure to the left hand end of cylinder 91, while in Figures 14 and 15 the channel 142 will register with ports 70 and 71 to relieve the right hand end of cylinder 91 through conduit 77.

Under these conditions, it will be seen that the pistons 78 and 89 remain in the positions described in connection with the previous speed selection, so that the gears 20 and 23 remain in mesh. However, piston 93 will be forced to the right, removing the member 96 from contact with the end of the piston rod 94 and rocking the arm 97 in a counterclockwise direction to engage the gears 24 and 28.

While we have illustrated in the accompanying drawings nine selective gear ratios and have described herein these ratios in sequence, it is to be understood that the invention contemplates any desired number of speed selections or gear ratios, be that more or less than those disclosed. It will also be noted that the drum 43 may be rotated in either direction to select any predetermined gear ratio, so that the operator may, with a minimum of effort, make his selection with accuracy, and by simple pressure on the handle of the drum open the slide valve when the selection is made to immediately and simultaneously shift one or both of the sliding gear clusters in accordance with the selection made.

From the above detailed description of the embodiment illustrated, it will readily be seen that any one of a plurality of feeds may be selected for feeding the sliding member or apron 4, or the cross slide 3, along or on the machine bed. The worm 35 on shaft 27 is driven in response to the selected gear ratio, the drive being completed through the worm wheel 36 and the gears 38, 39 and 41, gear 41 operating along the rack bar 42 to impart feeding motion to the slide and cross slide. The lever 7 engages and disengages the selected rate of power feed to the carriage or apron 4, while the lever 5 is employed to engage or disengage a selected rate of power feed to the cross slide 3. We have not illustrated in the drawings the precise power feed engaging and disengaging members actuated by the respective levers 5 and 7, since they may be of conventional form, such as disc or cone clutches, toothed elements such as gears, and a rack or sliding gears.

By our invention the operator is enabled to select a rate of feed for the carriage and/or the cross slide which is most practicable and desirable for the type of work to be done, that is either the tool carried by the cross slide may be fed at a preselected rate toward and into the work piece, or if the work piece is carried by the cross slide the latter may likewise be fed at a predetermined or selected rate toward the tool to perform the desired operation.

We claim:

1. The combination in a machine tool having a bed, a slide mounted to move along the bed at selected or preselected rates and an apron on said slide, of a selective change speed gearing carried by the apron, hydraulically responsive mechanism within the apron for shifting said gearing to obtain the different rates of feed available in said gearing, a driven feed member carried by the bed and having a driving connection with said selective gearing in the apron, and a rate selecting device carried by the apron and operable to select or preselect the desired rate of feed for the slide and then to actuate said hydraulic responsive mechanism to obtain the selected rate of feed for the slide, said rate selecting device comprising as a unit a valve having a rotary selector cylinder, said cylinder having a valve seat formed in one end, a valve head normally seated on the seat, and a single actuator for said valves.

2. In a machine tool having a bed and a slide and an apron movable on the bed, means in the apron for moving the slide at any one of a plurality of selected rates or movement, said means including a change speed gearing, hydraulically actuated device for effecting a gear ratio change, a source of fluid pressure, and a combined fluid control and selecting or preselecting valve connected with said source of fluid pressure and with said devices, said valve having a part movable to select or pre-select a desired rate of movement for the slide and another part movable within said first named part for controlling the supply of fluid pressure to said first part to actuate said devices whereby to impart a movement to the slide at the selected rate, and a single control member for moving said parts independently of one another.

OSKAR KYLIN.
HENRIK O. KYLIN.
MICHAEL L. VALENTINO.